United States Patent [19]

Madan

[11] 4,256,265

[45] Mar. 17, 1981

[54] ROTARY CUTTER BLADE

[75] Inventor: Bhim S. Madan, Brockport, N.Y.

[73] Assignee: General Electric Company, New York, N.Y.

[21] Appl. No.: 72,983

[22] Filed: Sep. 6, 1979

[51] Int. Cl.[3] ........................ B02C 18/18; A47J 44/00

[52] U.S. Cl. ........................................ 241/92; 83/356.3

[58] Field of Search .................. 241/92, 278 R, 273.1, 241/273.2, 282.1, 282.2; 83/355, 356.3, 411 A, 490, 666

[56] References Cited

U.S. PATENT DOCUMENTS

| | | | |
|---|---|---|---|
| 243,139 | 6/1881 | Kimmel . | |
| 2,678,073 | 5/1954 | De Nardis . | |
| 3,085,607 | 4/1963 | Schottle . | |
| 3,610,304 | 10/1971 | Popeil | 241/92 |
| 4,190,208 | 2/1980 | Schaeffer et al. | 241/92 |
| 4,198,887 | 4/1980 | Williams, Jr. | 83/356.3 |
| 4,199,112 | 4/1980 | McLean | 241/92 |

*Primary Examiner*—Howard N. Goldberg
*Attorney, Agent, or Firm*—John F. Cullen; George R. Powers; Leonard J. Platt

[57] ABSTRACT

In a food processor cutter blade on a disc rotated by a central shaft with the disc having a single rectangular locking-edged opening therethrough on one side only of the disc center with the opening terminating short of the disc center, a narrow slot is provided centrally of the opening and extends across the disc center. The disc has a depending central hub crossing the slot to receive the shaft therethrough. A removable locking-edged insert has a tab radially and frictionally slideable into the opening over the hub to totally support the disc. The insert has a first surface coplanar with the disc surface and another or resting surface contiguous with and depressed below the first surface. The insert also has a second surface above and spaced from both the first and resting surfaces by an arc-shaped elongated stepped opening facing in the direction of disc rotation and curved or scooped toward the disc surface. A multifingered cutter blade is secured to the second surface and has a plurality of cantilever spaced fingers substantially as wide as they are high with each finger bent to contact the resting surface and each finger has a cutting edge facing in the direction of rotation such that the fingers are rigidly supported at their ends to avoid distortion and cut adjacent elongated strips and direct them downwardly on disc rotation. All of the parts are of suitable plastic and the cutter blade is metallic and secured by any suitable means to the insert on the scoop. The overall arrangement is a rigidly supported cutter that does not distort and cuts evenly spaced elongated strips suitable for french fries and directs them downwardly away from the cutting disc.

4 Claims, 3 Drawing Figures

FIG. 1.
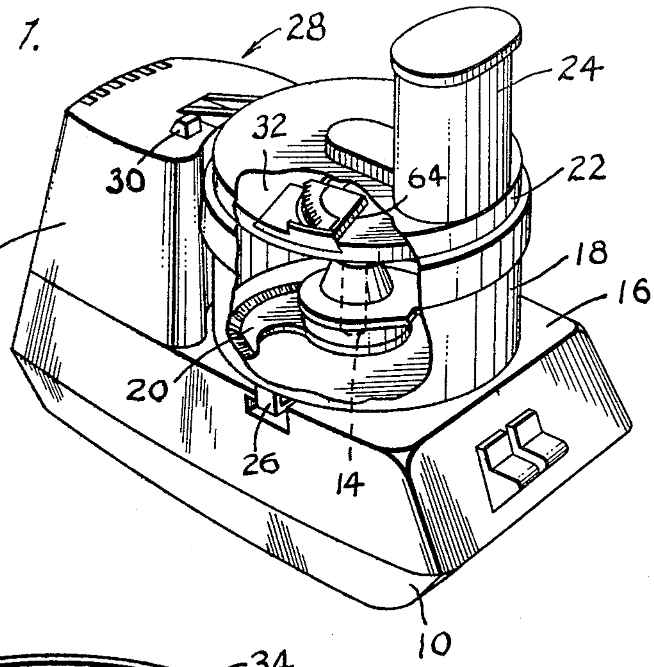
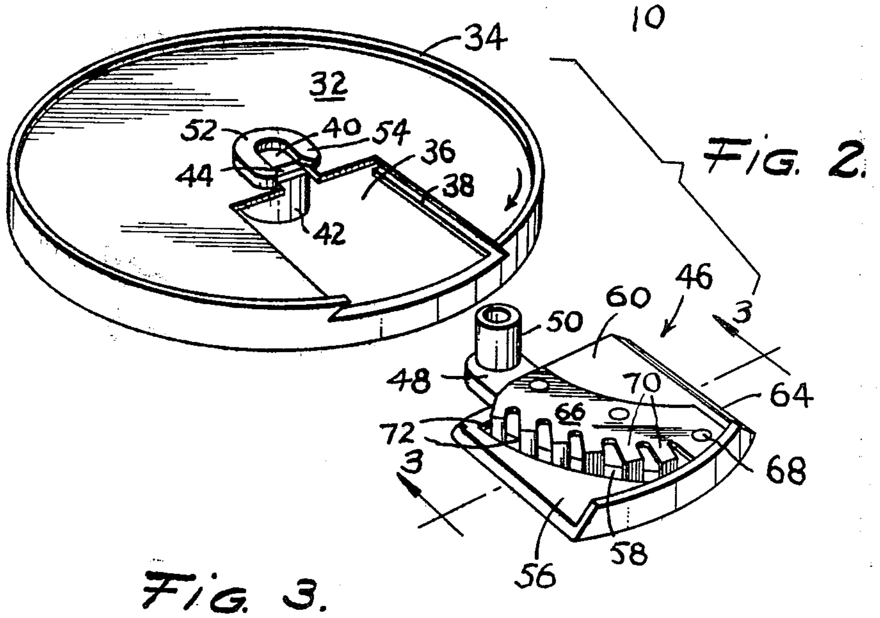
FIG. 2.
FIG. 3.
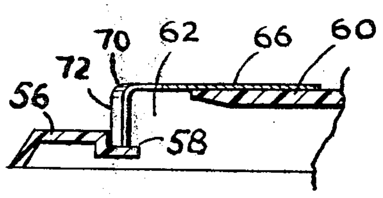

ROTARY CUTTER BLADE

BACKGROUND OF THE INVENTION

1. Field of the Invention

The invention relates to a food processor having a power base with a lid-covered bowl thereon and a feed chute through the lid to a cutting disc rotated by a shaft extending into the bowl. To this general arrangement an improved disc construction is provided whereby a french fry insert may be used in the disc to provide rigid and even cutting capabilities with the insert and disc cooperating to provide fixed restraint in all necessary directions and provide an essentially two-piece disc with a simple strip or french fry cutter blade on the insert.

2. Description of the Prior Art

It is known to use food processors, a device fitting in the speed range between blenders and mixers, as a multi-purpose kitchen apparatus that uses generally multiple interchangeable rotary tools such as blades, knives, cutting and rasping discs, and various attachments for blending, mixing, grating, grinding, chopping, slicing, whipping, and other operations in a short time. Such processors have become a commonly used kitchen appliance. They usually comprise a power base with a lid-covered bowl supporting portion and a vertically driven shaft extending into the bowl that carries the cutters in the base of the bowl or various forms of slicing discs that operate immediately below the lid and receive food from a feed chute through the lid. The lid is generally interlocked with the motor circuit to inactivate the processor when the lid is removed and the sharp cutting means or discs are exposed. Such food processors are generally well known and various forms of discs with the knives, rasps, and interchangeable cutters have been known in one form or another. Typically, a food slicer employing interchangeable cutters is shown in U.S. Pat. No. 3,085,607 and in application Ser. No. 955,348 filed Oct. 27, 1978 now U.S. Pat. No. 4,190,208 of common assignment which improves on the patented device.

An object of the invention is to provide a food processor of a generally known type with an improved rigid disc insert to provide untapered multiple, even, elongated adjacent strips.

Another object is to provide such a processor using a simple one-part disc and one-part insert that is substantially rigid and may be formed of any number of cutting fingers to dispense even elongated adjacent strips of food such as potatoes for french fries.

SUMMARY OF THE INVENTION

Briefly described, the invention is directed to a cutter assembly for a food processor cutter disc of a blade on a disc rotated by a shaft centrally thereof where the disc has a single rectangular locking-edged opening therethrough on one side only of the disc center and terminating short of the center. A narrow slot is provided centrally of the opening and it extends across the disc center and the disc has a depending central hub crossing the slot to receive the shaft therethrough. To this general disc/insert cutting arrangement an improvement is provided in a specific french fry insert that comprises a removable locking-edged insert with a tab radially and frictionally slideable into the opening over the hub so the insert totally supports the disc. The insert has a first surface coplanar with the disc surface and another resting surface contiguous with and depressed below the first surface. A second surface above and spaced from both the first and resting surfaces is provided by an elongated arced stepped opening facing in the direction of disc rotation and scooped or curved toward the disc surface to direct cut food away from the disc. A cutter blade is secured to the higher or second surface and the blade has a plurality of cantilever spaced fingers each substantially as wide as it is high and the ends of the fingers are bent to contact the resting surface. The fingers have cutting edges facing in the direction of rotation, the arrangement being such that the fingers are end supported on the resting surface for good undistorted rigidity while cutting adjacent elongated strips evenly and smoothly and directing them down into the bowl on disc rotation for uniform french fries. Thus, the main object of the invention is to provide a french fry insert for a food processor cutting disc which provides even thickness and untapered and undistorted elongated strips repetitively.

BRIEF DESCRIPTION OF THE DRAWING

FIG. 1 is a perspective view, partially in section, showing the processor arrangement;

FIG. 2 is an exploded view, showing the particular insert removed and,

FIG. 3 is a partial cross-section on line 3—3 of FIG. 2.

DESCRIPTION OF THE PREFERRED EMBODIMENT

Referring to FIG. 1 there is shown a food processor including a basic blender-type power base 10 which is preferably L-shaped having an upstanding motor containing housing unit 12 which has a suitable motor such as a low cost series motor driving a power shaft 14 by any suitable link between the power unit and shaft as well known in the art. Any power base 10 will suffice but the L-shaped is preferred since it presents an overall lower profile desirable in a kitchen appliance. Disposed on the bowl supporting portion 16 of the base is a removable bowl 18 with its separate removable cutter mechanism 20 well known in the art. The cutters perform a chopping operation on foods. Bowl 18 is a relatively large bowl having a removable lid 22 with an integral feed chute 24 by which food is introduced to the bowl. The bowl is locked in position on the base by suitable lugs 26 by rotating it into position on supporting portion 16. Thus, the bowl and cutter 20 are supported on portion 16 with the cutter being driven from motor unit 12 in the base 10 generally at a given speed. To prevent access to the moving cutter mechanism 20 in the bowl, the lid is secured to the bowl 18 by an interlocking mechanism generally indicated at 28 and releasable by knob 30 as detailed in U.S. Pat. No. 4,111,372 of common assignment.

For multiple food processing steps, it is known to provide one or more cutting discs 32 that may contain rasping or grating or slicing cutters as shown in FIGS. 5 and 6 of U.S. Pat. No. 3,892,365. Such disc cutters are used separately from chopping cutters 20 and operate just below the lid adjacent feeding chute 24 for performing separate operations into the bowl. Generally, additional discs are stored separately and are used separately although it is known to use insertable cutters by providing a longitudinal cutout completely across the disc and insert cutters of different configuration as shown in U.S. Pat. No. 3,085,607 on which the co-pending application Ser. No. 955,348, now U.S. Pat. No. 4,190,208 (both supra) improves by providing an insertable cutter for the disc structure which simplifies the disc structure, provides better support in the necessary direction, is inexpensive, by being completely plastic except for the cutter blade itself, and accurately locates the individual cutter very close to the other side of the lid to minimize the last bit of food from the chute being carried around on the top of the lid. That design provides greater utility since many different slice thicknesses, shred sizes, etc. are available at a minimum cost and with a minimum of storage space requiring only a small box to store a suitable number of cutter inserts. The present invention is directed to a particular one of those inserts that is designed to provide elongated adjacent strips of food that are undistorted and untapered and form an insert that is ideal for french fries.

Referring to FIG. 2, there is shown the improved cutting disc with a peripheral flange 34 completely around the disc and extending upwardly adjacent the inner surface of bowl 18 so that it nests closely against the bowl. For cutting, there is provided a single opening 36 that is substantially rectangular and has inwardly directly locking beveled edges 38 along each side with the opening 36 completely through the disc and peripheral flange 34 as seen in FIG. 2. The opening is disposed to terminate short of and adjacent the disc center with only a narrow slot 40 centrally of the opening, meaning the slot is substantially equidistant from each side of opening 36 and is directed radially inward to extend across the disc center. For support, the disc is provided with an integrally molded depending hub 42 at its center with part of the hub 44 crossing the slot 40 for a purpose to be described and with the hub sized to receive shaft 14 completely therethrough. For cutting, cooperating with the disc 32 is a removable locking bevel-edged and specifically formed cutter insert 46 which is sized to fit opening 36 and has a tab 48 that matches slot 40 to fit therein with the tab radially slidable into the opening end of the slot to contact the hub 42 at crossing portion 44 as the insert is installed into the open slot of disc 32 or slid inward and upward as shown in FIG. 2. For fixedly locating the vertical position of disc 32, the insert is provided with a stepped sleeve 50 that may be solid but is generally hollow as shown, the sleeve being disposed vertically on the end of tab 48 with the sleeve being cut with a counterbore at its bottom that can be varied in height and that vertically and fixedly locates the insert 46 on shaft 14 as disclosed in said co-pending Ser. No. 955,348 application, now U.S. Pat. No. 4,190,208. The beveled edges of the insert and the matching opening lock the insert in the opening against vertical movement and the fitting of sleeve 50 over the shaft end holds the insert in position against any radial movement outwardly of the disc. It will be apparent that the entire weight of disc 32 is supported and carried by insert 46 in the construction shown. Thus, except for the sleeve 50 abutting and carried on the end of shaft 14, the disc would drop down on the shaft since it would extend through hub 42. Additionally, while the support of the entire disc and insert is achieved by sleeve 50 resting on the top of shaft 14, additional frictional holding is obtained by providing the U-shaped collar 52 around the disc at its slot 40 with the U-opening toward the insert by forming it with a pinched portion 54 to frictionally squeeze the tab and assist in holding the insert in the disc. This also provides a snap-action sound to tell the user the insert is in position. This is all disclosed in said co-pending application Ser. No. 955,348, now U.S. Pat. No. 4,190,208.

Referring to FIGS. 2 and 3, the construction of the specifically formed french fry insert can be seen where the insert is provided with a first surface 56 that is coplanar with the surface of disc 32. To prevent cutter distortion a resting surface 58 is provided contiguous with and depressed slightly below the first surface 56 as seen in FIG. 3. The insert is formed with a second surface 60 that is above and spaced from both surfaces 56 and 58 by an elongated stepped opening 62 that faces in the direction of disc rotation as shown by the arrow. In order to direct the cut food downwardly, the disc insert has a back 64 on surface 60 that is directly downwardly so that, in effect, surface 60 is scooped downward toward the disc surface to direct food down into bowl 18. As seen, the stepped opening 62 is a complete arc across the face of the insert.

To provide adjacent even and elongated and undistorted and untapered strips of cut food on disc rotation, a specifically formed cutter blade 66 is secured by any suitable means to the second surface 60 such as by rivets 68 and the cutter blade is formed of a plurality of cantilever supported spaced fingers 70 that may be stamped so they are bent substantially at right angles to ensure their free ends always overlap and contact the resting surface 58. For uniformity, each of the bent fingers 70 has a forward facing cutting edge 72 to slice and cut into the food on disc rotation with the cutting fingers being substantially as wide as they are high as seen in FIG. 2.

With the food being inserted through chute 24, the tendency of unsupported fingers 70 is to bend and provide uneven, distorted or tapered elongated cuttings and the provision of the interfering resting surface 58 to support the ends of the fingers, provides an undistorted cutting arrangement for consistent, untapered, elongated, even cuttings that are ideal for french fries.

The device is inexpensive with all of the parts, excepting the cutter blade 46, being formed of plastic and the cutter blade is preferably metallic secured to the scoop portion. The general arrangement thus provides a simple two-part specific disc insert that provides a single disc with multiple cutting capabilities where the disc is totally carried by the insert which is specifically formed to provide consistent high grade elongated strips for perfect french fries. The insert is supported by the hub/tab contact with the insert being vertically restrained by the locked bevel edges and radially restrained by the shaft connection to sleeve 50 which provides constant relationship between the cutting edges and the bottom of the feed chute 24 to maintain the same distance from the top of shaft 14 and the bottom of chute 24 regardless of the thickness of the strip slices. As in the co-pending Ser. No. 955,348 application, now U.S. Pat. No. 4,190,208, different inserts may be used with the disc herein and the specific insert described and claimed herein provides rigidity for perfectly elongated undistorted and even french fry cutting.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. In a food processor cutter blade on a disc rotated by a shaft centrally thereof, the disc having a single rectangular locking-edged opening therethrough on one side only of the disc center and terminating short thereof, a narrow slot centrally of the opening and extending across the disc center, the disc having a depending central hub crossing said slot to receive the shaft therethrough, an improvement comprising, a removable locking-edged insert having a tab radially and frictionally slidable into said opening over the hub to totally support the disc, the insert having a first coplanar-with-the disc surface, a resting surface contiguous with and depressed below said first surface, a second surface above and spaced from said surfaces by an elongated stepped opening facing the direction of disc rotation and scooped toward the disc surface, a cutter blade secured to said second surface and having a plurality of cantilever spaced fingers each bent to contact the resting surface with facing cutting edges, whereby the fingers are end-supported and cut adjacent elongated strips and direct them down on disc rotation.

2. Apparatus as described in claim 1 wherein the stepped opening is an arc across the insert.

3. Apparatus as described in claim 2 wherein said fingers are substantially as wide as they are high spanning the stepped opening to provide rigidity and avoid distortion on cutting.

4. Apparatus as described in claim 3 wherein all parts are plastic and the cutter blade is metallic secured to the insert on the scoop.

* * * * *